US012650979B2

(12) United States Patent
Liu et al.

(10) Patent No.: US 12,650,979 B2
(45) Date of Patent: Jun. 9, 2026

(54) METHOD FOR INFORMATION PROCESSING BASED ON LLM, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Haocheng Liu, Beijing (CN); Haiyang Xu, Beijing (CN); Liangjie Zhang, Beijing (CN); Qian Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/745,835

(22) Filed: Jun. 17, 2024

(65) Prior Publication Data

US 2025/0005018 A1     Jan. 2, 2025

(30) Foreign Application Priority Data

Sep. 22, 2023     (CN) .......................... 202311238693.3

(51) Int. Cl.
*G06F 7/00* (2006.01)
*G06F 16/00* (2019.01)
*G06F 16/21* (2019.01)
*G06F 16/242* (2019.01)
*G06F 16/248* (2019.01)

(52) U.S. Cl.
CPC .......... *G06F 16/242* (2019.01); *G06F 16/212* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 2024/0185137 A1* | 6/2024 | Atlan | ..................... | G06N 20/00 |
| 2024/0248896 A1* | 7/2024 | Boskovic | .......... | G06F 16/24522 |
| 2024/0338361 A1* | 10/2024 | Hazel | ................. | G06F 16/2423 |
| 2024/0427567 A1* | 12/2024 | Murthy | ................ | G06F 16/211 |
| 2025/0021767 A1* | 1/2025 | Dharnidharka | ... | G06F 16/90332 |

\* cited by examiner

*Primary Examiner* — Tuan A Pham
(74) *Attorney, Agent, or Firm* — Osha Bergman Watanabe & Burton LLP

(57) ABSTRACT

A computer-implemented for information processing based on a large language model (LLM) includes: obtaining a query request; determining, by the LLM and based on the query request, a query condition, a source of a query result, and a select field for generating a structured query language (SQL) statement; generating by the LLM, the SQL statement by combining the query condition, the source of the query result, and the select field; and obtaining the query result corresponding to the query request, by inputting the SQL statement into the LLM for execution.

16 Claims, 9 Drawing Sheets dialog box example:

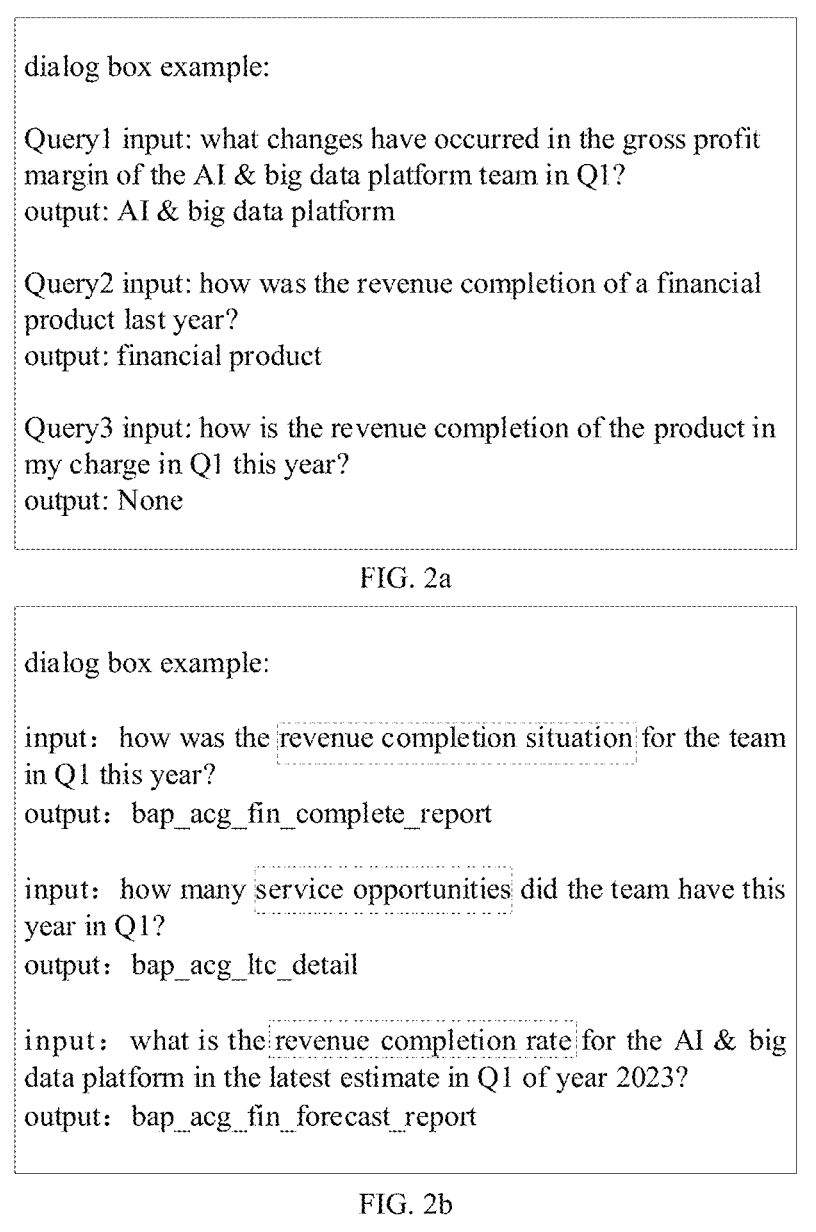

Query1 input: what changes have occurred in the gross profit margin of the AI & big data platform team in Q1?
output: AI & big data platform Query2 input: how was the revenue completion of a financial product last year?
output: financial product Query3 input: how is the revenue completion of the product in my charge in Q1 this year?
output: None

FIG. 2a dialog box example:

input： how was the revenue completion situation for the team in Q1 this year?
output： bap_acg_fin_complete_report input： how many service opportunities did the team have this year in Q1?
output： bap_acg_ltc_detail input： what is the revenue completion rate for the AI & big data platform in the latest estimate in Q1 of year 2023?
output： bap_acg_fin_forecast_report

FIG. 2b

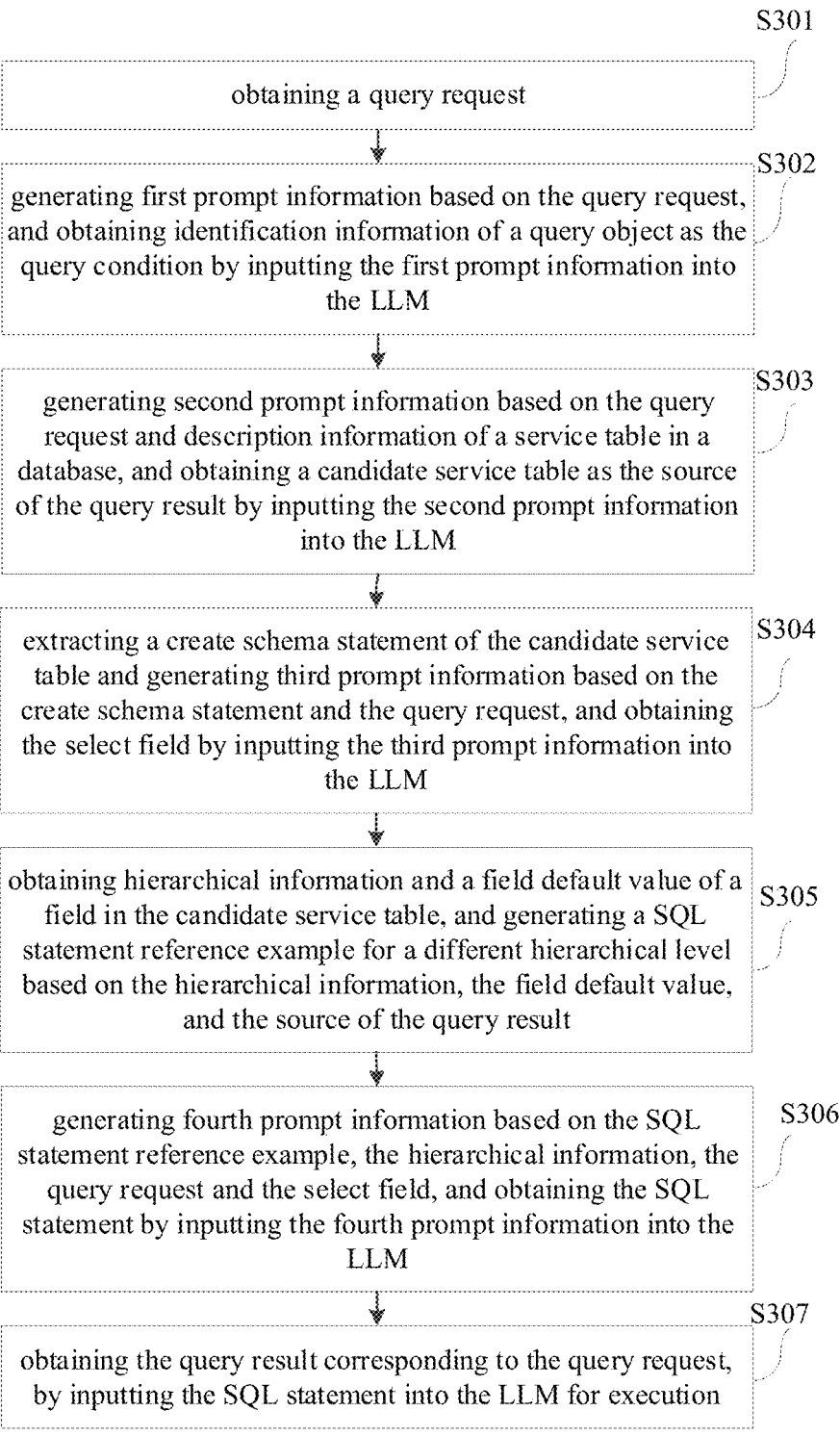

S301 obtaining a query request

S302 generating first prompt information based on the query request, and obtaining identification information of a query object as the query condition by inputting the first prompt information into the LLM

S303 generating second prompt information based on the query request and description information of a service table in a database, and obtaining a candidate service table as the source of the query result by inputting the second prompt information into the LLM

S304 extracting a create schema statement of the candidate service table and generating third prompt information based on the create schema statement and the query request, and obtaining the select field by inputting the third prompt information into the LLM

S305 obtaining hierarchical information and a field default value of a field in the candidate service table, and generating a SQL statement reference example for a different hierarchical level based on the hierarchical information, the field default value, and the source of the query result

S306 generating fourth prompt information based on the SQL statement reference example, the hierarchical information, the query request and the select field, and obtaining the SQL statement by inputting the fourth prompt information into the LLM

S307 obtaining the query result corresponding to the query request, by inputting the SQL statement into the LLM for execution

FIG. 3

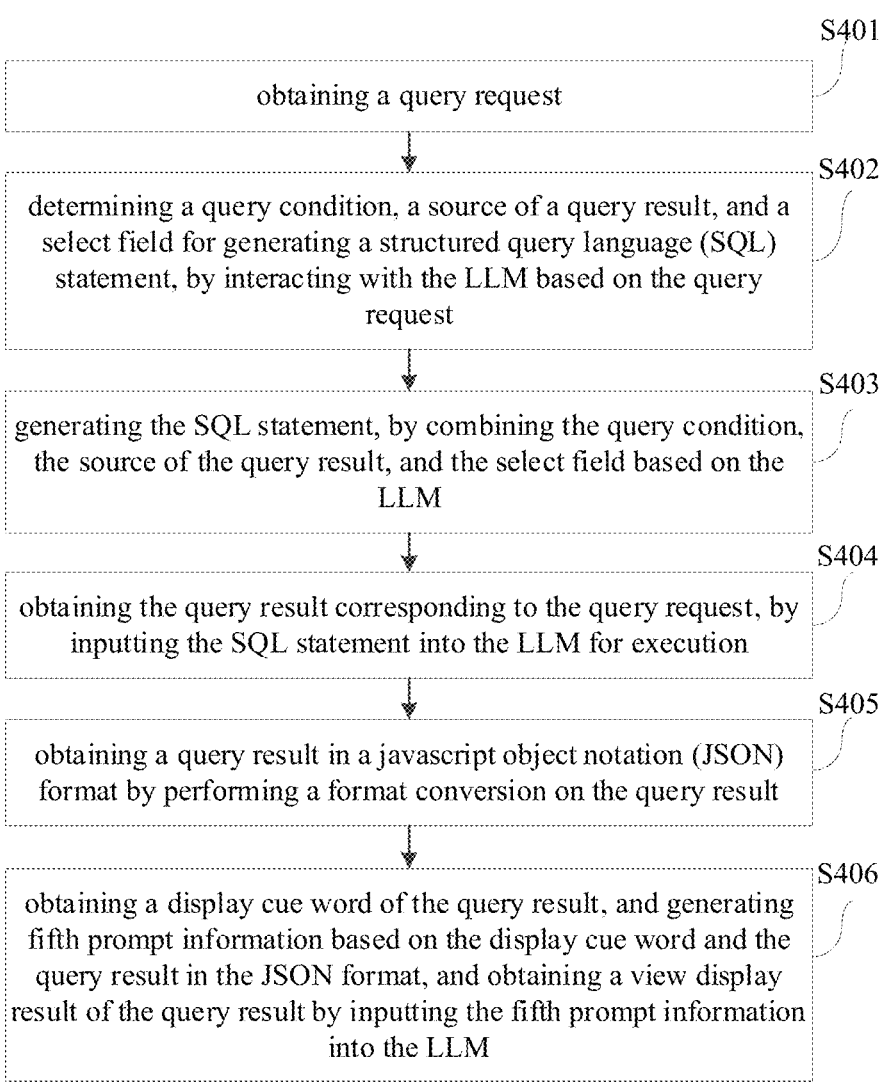

S401 obtaining a query request

S402 determining a query condition, a source of a query result, and a select field for generating a structured query language (SQL) statement, by interacting with the LLM based on the query request

S403 generating the SQL statement, by combining the query condition, the source of the query result, and the select field based on the LLM

S404 obtaining the query result corresponding to the query request, by inputting the SQL statement into the LLM for execution

S405 obtaining a query result in a javascript object notation (JSON) format by performing a format conversion on the query result

S406 obtaining a display cue word of the query result, and generating fifth prompt information based on the display cue word and the query result in the JSON format, and obtaining a view display result of the query result by inputting the fifth prompt information into the LLM

FIG. 4

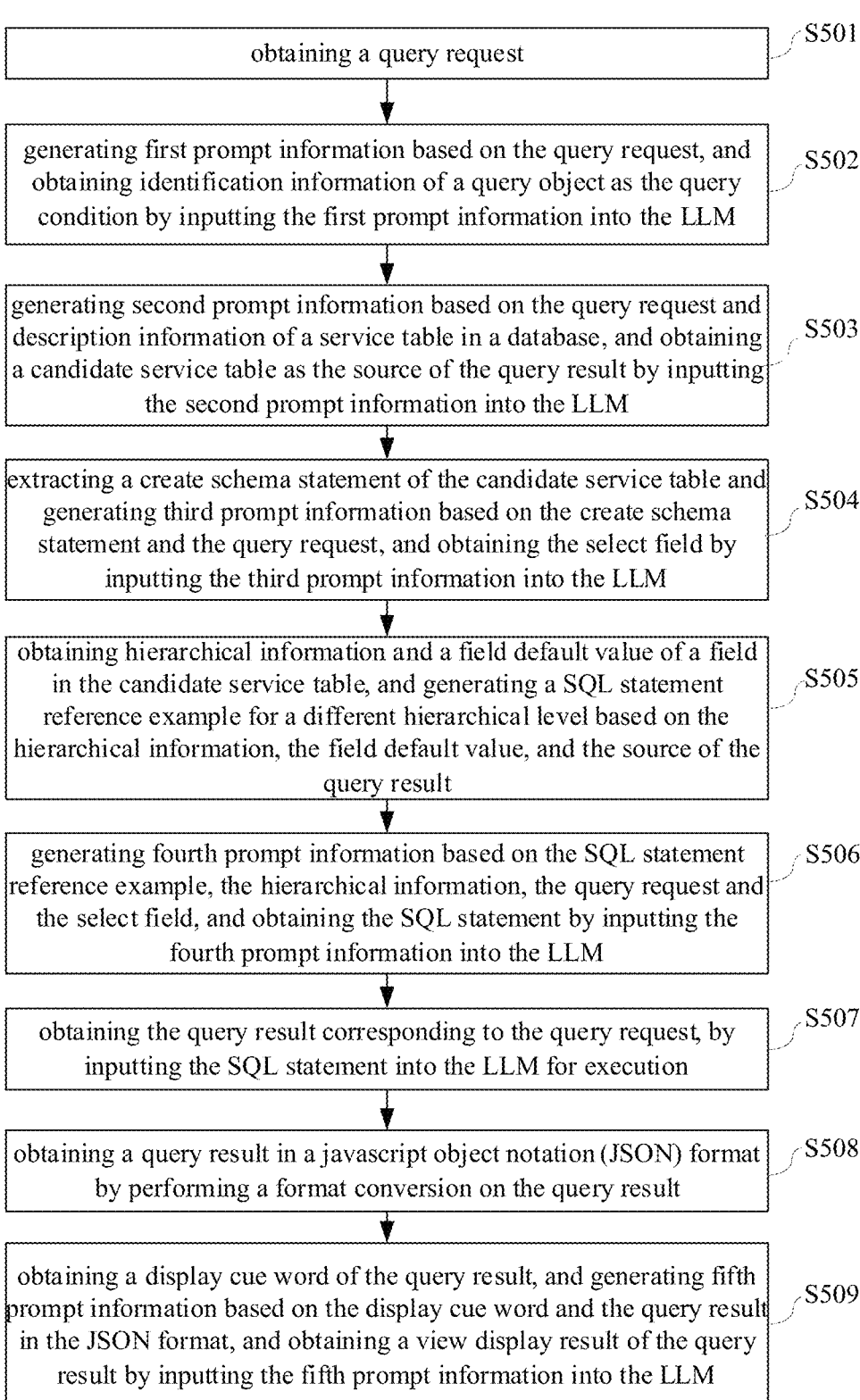

obtaining a query request ⌐S501 generating first prompt information based on the query request, and obtaining identification information of a query object as the query condition by inputting the first prompt information into the LLM ⌐S502 generating second prompt information based on the query request and description information of a service table in a database, and obtaining a candidate service table as the source of the query result by inputting the second prompt information into the LLM ⌐S503 extracting a create schema statement of the candidate service table and generating third prompt information based on the create schema statement and the query request, and obtaining the select field by inputting the third prompt information into the LLM ⌐S504 obtaining hierarchical information and a field default value of a field in the candidate service table, and generating a SQL statement reference example for a different hierarchical level based on the hierarchical information, the field default value, and the source of the query result ⌐S505 generating fourth prompt information based on the SQL statement reference example, the hierarchical information, the query request and the select field, and obtaining the SQL statement by inputting the fourth prompt information into the LLM ⌐S506 obtaining the query result corresponding to the query request, by inputting the SQL statement into the LLM for execution ⌐S507 obtaining a query result in a javascript object notation (JSON) format by performing a format conversion on the query result ⌐S508 obtaining a display cue word of the query result, and generating fifth prompt information based on the display cue word and the query result in the JSON format, and obtaining a view display result of the query result by inputting the fifth prompt information into the LLM ⌐S509

FIG. 5

METHOD FOR INFORMATION PROCESSING BASED ON LLM, ELECTRONIC DEVICE, AND STORAGE MEDIUM

CROSS-REFERENCE TO RELATED APPLICATION

The present application is based upon and claims priority to Chinese Patent Application No. 2023112386933, filed on Sep. 22, 2023, the entire contents of which are incorporated herein by reference.

TECHNICAL FIELD

The present disclosure relates to the field of data processing technology, and in particular to the fields of artificial intelligence, intelligent search, big data, and natural language processing, and in particular to a method for information processing based on a large language model (LLM), an electronic device, and a storage medium.

BACKGROUND

The interactions between a user and a conventional data analysis system are mainly based on a graphical user interface of the system. In complex query scenarios, the user needs to switch the interface for several times. In the query process, fixed structured query language (SQL) statements are usually triggered, which makes the system less flexible.

SUMMARY

According to a first aspect of the present disclosure, a computer-implemented method for information processing based on a large language model (LLM) is provided. The method includes: obtaining a query request: determining, by the LLM and based on the query request, a query condition, a source of a query result, and a select field for generating a structured query language (SQL) statement: and generating, by the LLM, the SQL statement by combining the query condition, the source of the query result, and the select field: and obtaining the query result corresponding to the query request, by inputting the SQL statement into the LLM for execution.

According to a second aspect of the present disclosure, an electronic device is provided. The electronic device includes: at least one processor: and a memory communicatively coupled to the at least one processor and storing instructions executable by the at least one processor. When the instructions are executed by the at least one processor, the at least one processor is caused to perform the method according to the first aspect.

According to a third aspect of the present disclosure, a non-transitory computer readable storage medium is provided, storing computer instructions. The computer instructions are caused to enable a computer to perform the method according to the first aspect.

It should be understood that the description in this section is not intended to identify key or important features of embodiments of the present disclosure, nor is it intended to limit the scope of the present disclosure. Other features of the present disclosure will be readily understood by the following specification.

BRIEF DESCRIPTION OF THE DRAWINGS

The accompanying drawings are used for a better understanding of the disclosure and do not constitute a limitation of the present disclosure.

FIG. 2a is a schematic illustrating an extraction of a team name according to an embodiment of the present disclosure.

FIG. 2b is a schematic illustrating table reference information according to an embodiment of the present disclosure.

FIG. 3 is a flowchart illustrating another method for information processing based on a LLM according to an embodiment of the present disclosure.

FIG. 4 is a flowchart illustrating another method for information processing based on a LLM according to an embodiment of the present disclosure.

FIG. 5 is a flowchart illustrating another method for information processing based on a LLM according to an embodiment of the present disclosure.

DETAILED DESCRIPTION

Exemplary embodiments of the present disclosure are described hereinafter in conjunction with the accompanying drawings, which include various details of the embodiments of the present disclosure in order to aid in understanding, and should be considered exemplary only. Accordingly, one of ordinary skill in the art should recognize that various changes and modifications can be made to the embodiments described herein without departing from the scope of the present disclosure. Similarly, descriptions of well-known features and structures are omitted from the following description for the sake of clarity and brevity.

Data processing is the process of extracting and deriving data from a large amount of disorganized and incomprehensible data that is valuable and meaningful to users with certain features. Data is an expression form of facts, concepts, or instructions that can be processed by manual or automated devices. The data becomes information when it is interpreted and given a certain meaning. The data processing is the collection, storage, retrieval, processing, transformation, and transmission of the data.

Artificial intelligence (AI) is a new technological science that researches and develops theories, methods, technologies and application systems for simulating, extending and expanding human intelligence, which can simulate the information process of human consciousness and thinking, with the main goal of making the AI capable of performing complex tasks that usually require human intelligence to accomplish.

Intelligent search is a new generation of search combined with artificial intelligence technology, in addition to providing conventional fast search, relevance sorting and other functions, but also provides user role registration, automatic identification of user interests, semantic understanding of the content, intelligent information filtration and push, and other functions.

Big data is a vast amount of data that can not be captured, managed, processed, and organized via mainstream software tools into more positive information for assisting service decisions within a reasonable period of time. The big data includes structured, semi-structured and unstructured data.

Natural language processing (NLP) is an important direction in the field of computer science and artificial intelligence, which includes various theories and methods that may realize effective communication between humans and computers in natural language, and is mainly applied to aspects such as machine translation, public opinion monitoring, automatic summarization, viewpoint extraction, text categorization, question answering, text semantic comparison, speech recognition, and Chinese optical character recognition (OCR).

Figure 1:
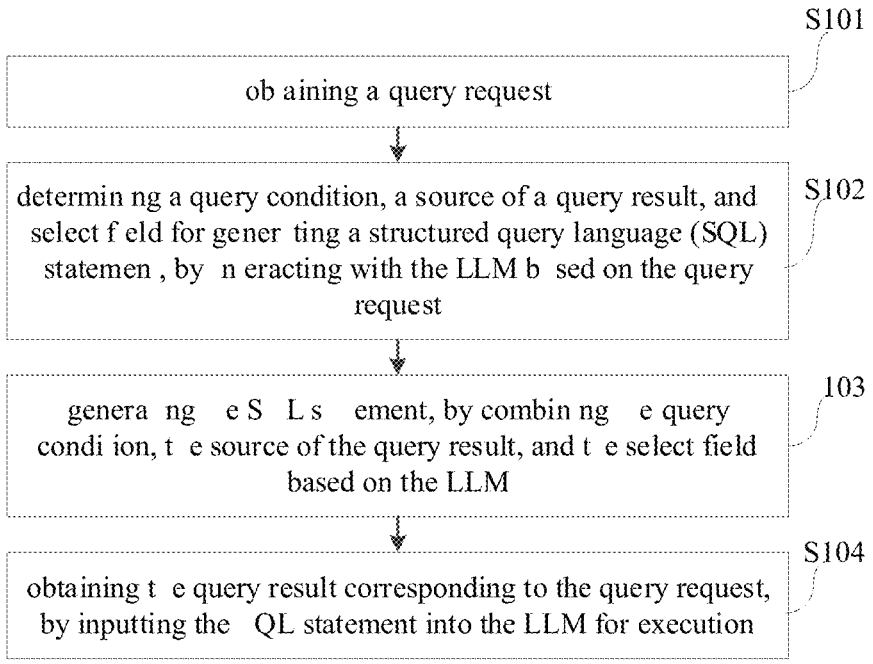
FIG. 1 is a flowchart illustrating a method for information processing based on a LLM according to an embodiment of the present disclosure.

FIG. 1 is a flowchart illustrating a method for information processing based on a LLM according to an embodiment of the present disclosure. As shown in FIG. 1, the method includes, but is not limited to, the following steps S101 to S104.

At S101, a query request is obtained.

In some implementations, the query request includes a query intent and a query purpose of the user.

Optionally, the query request may be a request entered by the user in real time, or may be a request determined from requests historically queried by the user.

For example, the query request may be "how was the revenue completion situation of a financial product last year" or "how much is the revenue of Zhang San". It may be understood that when the query request is "how was the revenue completion situation of a financial product last year", the query intent or the query purpose of the user is to obtain the revenue completion situation of the financial product last year. When the query request is "how much is the revenue of Zhang San", the query intent or the query purpose of the user is to obtain the revenue of Zhang San.

At S102, a query condition, a source of a query result, and a select field for generating a SQL statement is determined by interacting with the LLM based on the query request.

The LLM refers to a deep learning model trained using a large amount of text data that can generate a natural language text or a meaning of understanding a language text, and can handle a plurality of natural language tasks. The LLM can be trained based on small-scale datasets in specific fields to customize solutions to specific problems in different fields.

Optionally, the LLM may be a model such as a chat generative pre-training converter that can intelligently understand and process the text.

In some implementations, the query request may be input into the pre-trained LLM, i.e., interacting the query request with the LLM, so that the query condition, the source of query result, and the select field are determined by the LLM. Optionally, the query condition may be understood as a 'where' condition in a SQL statement, the source of the query result may be understood as a 'from' condition in the SQL statement, and the select field may be understood as a 'select' condition in the SQL statement.

In some implementations, the query condition (i.e., the 'where' condition) may include a name of the specific team or individual to be queried, for example, when the query request is "What is the revenue of Zhang San", the specific individual name "Zhang San" is identified as the query condition. The query condition is recognized as a query condition. When the query condition is determined by the LLM, the name of the specific team or individual can be parsed first, and if there are relevant results in the database, the similarity of each relevant result will be calculated and sorted, and a result with the highest similarity will be selected as the query condition.

In some implementations, the source of the query result (i.e., the 'from' condition) is also a source of a result obtained according to the query request and query condition. For example, a query result being the revenue table of Zhang San is obtained based on the query request "how much is the revenue of Zhang San", in which the revenue table may include other information than the revenue of Zhang San. Therefore, it can be assumed that the source of the query result is the revenue table when the query is performed based on the query request.

In some implementations, the select field is used to narrow down the fields in the table to obtain fields that are more relevant to the query request for processing in order to improve the efficiency and accuracy of the query. For example, the revenue table obtained from the query request "how much is the revenue of Zhang San" includes information such as a completed revenue, a revenue completion rate, a completed operating profit, a completed operating profit rate, etc. However, the query request is to obtain the revenue situation of Zhang San, thus it can be determined that the select fields are the completed revenue and the revenue completion rate, to improve the accuracy of the query analysis.

Further, the SQL statement is generated by the obtained query condition, the source of the query result, and the select field, to improve the flexibility and accuracy of the SQL statement.

At S103, the SQL statement is generated by combining the query condition, the source of the query result, and the select field based on the LLM.

In some implementations, after determining the query condition (i.e., the 'where' condition), the source of the query result (i.e., the 'from' condition), and the select field, prompt information may be generated by combining the query condition, the source of the query result, and the select field based on the LLM. For example, important information is extracted from the query condition, the source of the query result, and the select field via the LLM, and the extracted important information is combined as the prompt information, which includes at least relevant important information of the query request. The corresponding SQL statement is then generated based on the prompt information, which may ensure the accuracy of the SQL statement while ensuring the conciseness of the SQL statement. In other words, after the 'where' condition, the 'from' condition and the select field for generating the SQL statement are obtained, the important information is extracted from the 'where' condition, the 'from' condition and the select field based on the LLM, the extracted important information is combined as the prompt information, and the corresponding SQL statement is generated based on the prompt information.

In some implementations, the input of the LLM may also include an example of the generated SQL statement, and the LLM combines and processes input information such as the query condition, the source of the query result, and the select field based on the SQL example to obtain a more accurate and reasonable SQL statement.

At S104, the query result corresponding to the query request is obtained by inputting the SQL statement into the LLM for execution.

It may be understood that the SQL statement includes the important information of the query condition corresponding to the query request, the source of the query result, and the select field. Thus, after the SQL statement is determined, the SQL statement is input into the LLM, information feature of the query request included in the SQL statement is extracted by the LLM again, and a query result highly similar to the SQL statement is obtained based on the extracted information feature.

In the embodiments of the present disclosure, the SQL statement is generated based on information such as the query condition, the source of the query result, and the select field related to the query request, to improve the flexibility of generating the SQL statement, so that the different query request corresponds to the different SQL statement, which may ensure the query result obtained based on the SQL statement and the LLM to be more accurate, solve the low flexibility problem when the SQL statement is obtained, and improve the user experience.

Figure 2:
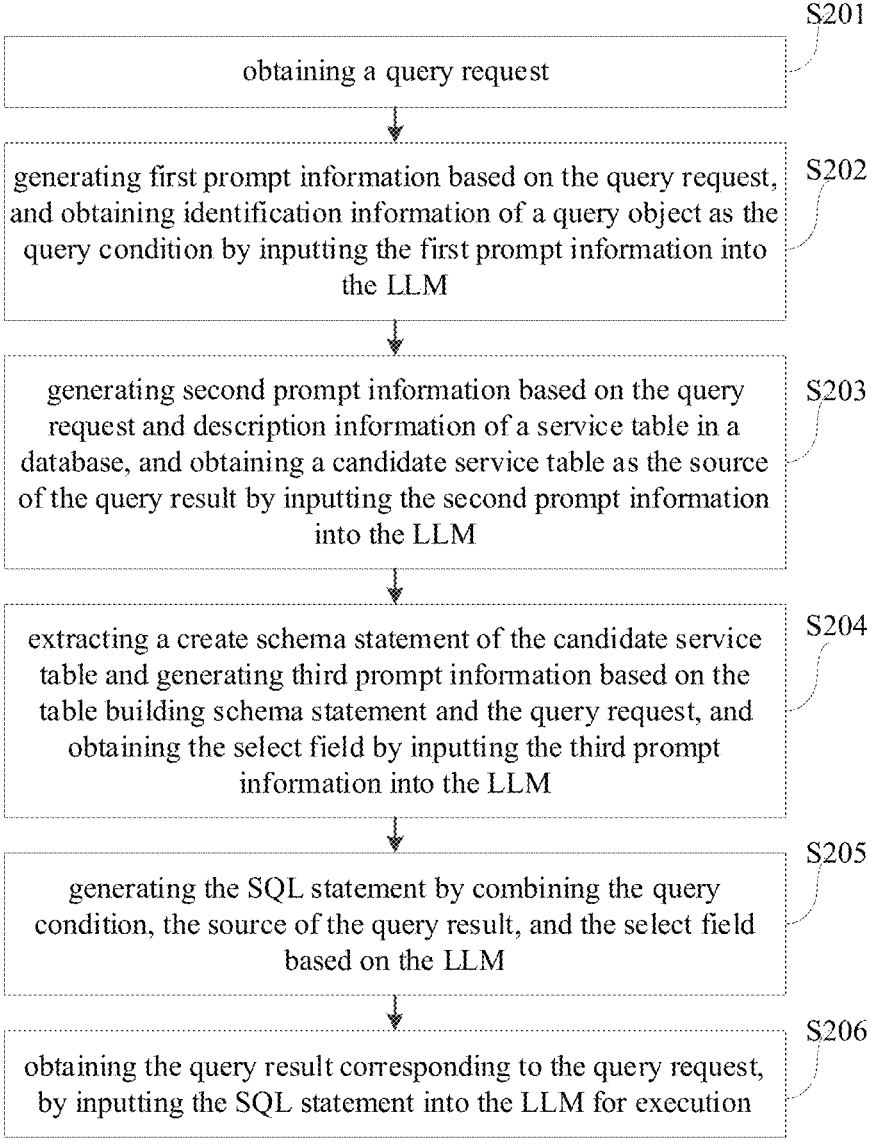
FIG. 2 is a flowchart illustrating another method for information processing based on a LLM according to an embodiment of the present disclosure.

FIG. 2 is a flowchart illustrating a method for information processing based on a LLM according to an embodiment of the present disclosure. As shown in FIG. 2, the method includes, but is not limited to, the following steps S201 to S206.

At S201, a query request is obtained.

In the embodiments of the present disclosure, the method for realizing the step S201 may be realized in any one of the respective embodiments of the present disclosure respectively, which is not limited herein and will not be repeated herein.

At S202, first prompt information is generated based on the query request, and identification information of a query object is obtained as the query condition by inputting the first prompt information into the LLM.

In some implementations, the first prompt information may be a more rich text generated by adding limitations to the query request, to facilitate a more detailed and comprehensive representation of the query request. For example, modifiers, adjectives, or detailed settings are added to the query request, thus realizing the purpose of determining the query request more accurately based on the first prompt information.

Further, after generating the first prompt information, the first prompt information is input into the LLM to output the identification information of the query object. It may be understood that the identification information of the query object may be information that can uniquely correspond to the query object, such as a name or number of the query object.

Optionally, the identification information of the query object may be information such as the name of a specific team or a specific individual, such as a department name, a product name, an industry name, or a person name.

After determining the identification information of the query object, the identification information is used as a query condition for subsequent querying to facilitate obtaining the information of the query object.

For example, the following content can be displayed in a dialog box. If a team name (or a department name, or a product name, or an industry name) is extracted from one sentence, in response to extracting, the result is returned, and if the team name is not extracted, None is returned as the first prompt information. As shown in FIG. 2a, the team name (or the department name, or the product name, or the industry name) is extracted by inputting the query request, and a different result is returned, depending on whether it can be extracted.

At S203, second prompt information is generated based on the query request and description information of a service table in a database, and a candidate service table is obtained as the source of the query result by inputting the second prompt information into the LLM.

In some implementations, configuration information of the database may be obtained and description information of the service table may be determined based on the configuration information to improve the efficiency and accuracy of obtaining the related information of the service table. The configuration information of the database is understood to include related information of different types of service tables, and the related information may include the amount of data included in the service table, description information of the service table, storage location of the service table, and other related information of the service table. The description information of the service table in the database is used to provide a function description of the service table as well as a description of information contained in the service table. The description information may include, but is not limited to, a table name of the service table and a function of the service table, and the like.

For example, the database may include three service tables, the first service table is named as bap_acg_fin_complete_report, the second service table is named as bap_acg_cost_complete_report, and the third service table is named as bap_acg_ltc_detail.

The description information of the service table 'bap_acg_fin_complete_report' may include a function of the service table, i.e., storing and analyzing application data for the revenue completion index. The record content of the service table includes: index data under different time periods (yearly, quarterly, monthly) and period types (yearly, quarterly, monthly), including a completed revenue, a completed operating profit, a completed operating profit rate, and a completed revenue completion rate, etc.

The description information of the service table 'bap_acg_cost_complete_report' may include a function of the service table, i.e., storing and analyzing application data for a cost completion index. The record content of the service table includes: cost forecast data under different time periods (yearly, quarterly, monthly), period types (yearly, quarterly, monthly), page types (whole ACG, ACG Core, ACG MA), service types (the whole department, sub-industry, sub-product, and sub-sales), and different levels of categories (level-0 category, level-1 category, level-2 category, level-3 category, and level-4 category).

The description information of the service table 'bap_acg_ltc_detail' may include a function of the service table, i.e., storing details of a contract, a service opportunity, a project, etc. The record content of the service table includes: contains various attribute information and date information related to the service opportunity, the project, and the sale, and forecast and budget data related to the revenue and profit.

Optionally, table reference information may be generated based on the description information of the service table, and a first target cue word is generated by writing the query request into a first preset cue word: and the second prompt information is generated by splicing the table reference information and the first target cue word.

It may be understood that the table reference information includes at least information that can reflect the main function and record content of the service table, to facilitate determining information such as the function of the table based on the table reference information.

Further, the first target cue word is obtained by writing the query request into the first preset cue word, the first target cue word is configured to cue or guide the LLM, so as to output a query result that well matches the query request. Optionally, the first preset cue word needs to include at least a field related to the question in the query request, but it is not allowed to arbitrarily forge a field that does not exist.

It may be understood that the second prompt information is information determined after splicing the table reference information and the first target cue word and enriching the text. Thus, after determining the second prompt information, the second prompt information is input into the LLM, and the candidate service table may be output that is highly similar to the query request. This improves the accuracy of obtaining the candidate service table.

In some implementations, there may be one or more candidate service tables, and the candidate service table is a source of the query result. When there are a plurality of candidate service tables, the table name of each candidate service table may be separated by a specific character, such as ",", and in case that the candidate service table is not obtained, "None" is returned.

For example, as shown in FIG. 2b, the dialog box includes the second prompt information, in which the second prompt information can be obtained by splicing the table reference information and the first target cue word. The content in dotted line boxes is the table reference information.

At S204, a create schema statement of the candidate service table is extracted, third prompt information is generated based on the create schema statement and the query request, and the select field is obtained by inputting the third prompt information into the LLM.

It may be understood that the create schema statement is a statement used to create a new table, and all the fields or key fields included in the candidate service table are determined based on the create schema statement. A field is a column in a table that is typically used to store a specific data type, and each field has a unique name that identifies the field. Optionally, the field can be in a different data type such as a number, a date, etc., and each field has a data type and a length.

After the candidate service table is determined, the third prompt information may be generated based on the create schema statement and the query request, and the third prompt information can be configured to prompt the LLM to obtain the field involved in the query request. The third prompt information is input into the LLM to obtain the field involved in the query request as the select field, and the select field is analyzed and processed to narrow down the scope of the query field, to make the query content and query condition more precise and more efficient.

At S205, the SQL statement is generated by combining the query condition, the source of the query result, and the select field based on the LLM.

In an embodiment of the present disclosure, the method for realizing the step S205 may be realized in any one of the respective embodiments of the present disclosure respectively, which is not limited herein and will not be repeated herein.

At S206, the query result corresponding to the query request is obtained by inputting the SQL statement into the LLM for execution.

In some implementations, a query result in a java script object notation (JSON) may be obtained by performing a format conversion on the query result, and sixth prompt information is generated based on the create schema statement and the query result in the JSON format. The query result in the JSON format is more convenient to understand and analyze, and the create schema statement may include forms such as English, thus a data report of the query result may be obtained by inputting the sixth prompt information into the LLM, and the display result of the data report is more intuitive, which facilitates understanding and querying of the user and improves the user experience.

In an embodiment of the present disclosure, the method for realizing the step S206 may be realized in any one of the respective embodiments of the present disclosure respectively, which is not limited herein and will not be repeated herein.

In the embodiments of the present disclosure, the prompt information is configured to obtain the query condition of the query request, the source of the query result, and the select field. As such, rich and complete prompt information ensures the accuracy and integrity of the acquired information. Furthermore, information such as the description information of the service table in the database and the create schema statement of the candidate service table is used as a part of the prompt information, which ensures the integrity of the information contained in the prompt information. The SQL statement is determined based on the more complete and accurate query condition, the source of the query result and the select field, and the SQL statement is executed to get the query result with a high accuracy. The format conversion of the query result is performed, and the data report of the query result is determined based on the create schema statement and the query result in the JSON format, so that the query result is displayed in a more intuitive form, which is easy for the user to understand and query.

FIG. 3 is a flowchart illustrating a method for information processing based on a LLM according to an embodiment of the present disclosure. As shown in FIG. 3, the method includes, but is not limited to, the following steps S301 to S307.

At S301, a query request is obtained.

In an embodiment of the present disclosure, the method for realizing the step S301 may be realized in any one of the respective embodiments of the present disclosure respectively, which is not limited herein and will not be repeated herein.

At S302, first prompt information is generated based on the query request, and identification information of a query object is obtained as the query condition by inputting the first prompt information into the LLM.

In an embodiment of the present disclosure, the method for realizing the step S302 may be realized in any one of the respective embodiments of the present disclosure respectively, which is not limited herein and will not be repeated herein.

At S303, second prompt information is generated based on the query request and description information of a service table in a database, and a candidate service table is obtained as the source of the query result by inputting the second prompt information into the LLM.

In an embodiment of the present disclosure, the method for realizing the step S303 may be realized in any one of the respective embodiments of the present disclosure respectively, which is not limited herein and will not be repeated herein.

At S304, a create schema statement of the candidate service table is extracted and third prompt information is generated based on the create schema statement and the query request, and the select field is obtained by inputting the third prompt information into the LLM.

In an embodiment of the present disclosure, the method for realizing the step S304 may be realized in any one of the respective embodiments of the present disclosure respectively, which is not limited herein and will not be repeated herein.

At S305, hierarchical information and a field default value of a field in the candidate service table are obtained, and a SQL statement reference example of a different hierarchical level is generated based on the hierarchical information, the field default value, and the source of the query result.

In some implementations, the hierarchical information for the fields in the candidate service table includes at least a hierarchical relationship among the fields existed in the candidate service table, and the hierarchical relationship may be used to indicate a parent-child relationship between data, where a piece of data may have one or more parent levels and may also consist of one or more child levels. The common hierarchical relationship includes hierarchical relationships in an organizational structure, a commodity category, a region, etc. For example, in the case where the fields in the candidate service table correspond to a cloud computing and a big data development platform, and the big data development platform is a sub-team of the cloud computing, there exists a hierarchical relationship between the cloud computing and the big data development platform.

Optionally, the hierarchy information may include: page type information: (page_type), service type information (category), and hierarchy relationships such as the level 0 category (category_l0), the level 1 category (category_l1), the level 2 category (category_l2), the level 3 category: (category_l3), and the level 4 category (category_l4).

It may be understood that category_l0 is the largest level, category_l1 is a next level of category_l0, category_l2 is a next level of category_l1, category_l3 is a next level of category_l2, and category_l3 is a next level of category_l4.

In some implementations, a field default value of a field in the candidate service table refers to a value that is not input by the user for a field and is automatically set by the system sets, and the default value is stored in the system to ensure the integrity of the data. For example, the field default value can be a numerical value and a string with no special meaning such as 0, null, or empty.

The SQL statement reference example of the different hierarchical level is generated based on the hierarchical information, the field default value, and the source of the query result, to ensure the LLM is able to output a more accurate query result.

Optionally, a preset candidate query request may be obtained and a target hierarchical level of a query object for the candidate query request may be determined: a query condition example and a select field example for the candidate query request are determined based on the hierarchical information and the field default value: and a SQL statement reference example for the target hierarchical level is generated based on the query condition example, the select field example, and the source of the query result.

For example, assuming a team, an individual, a whole department, or an industry is queried, the preset candidate query request may be "how was the revenue completion situation of my team in Q1 of year 2023", and the query object of the candidate query request is determined to be "my team", and the target hierarchical level of the query object is category_l0. Thus, a query condition example of the candidate query request may be determined based on the hierarchical information and the field default value, i.e., "d_year=2023 AND d_quarter=1 AND date_type='QUARTER' AND page_type='ACG Core' AND category='EMPTY' AND category_l0='EMPTY' AND category_l1='EMPTY' AND category_l2='EMPTY' AND category_l3='EMPTY' AND category_l4='EMPTY'", where d_year denotes year information, d_quarter denotes quarter information, date_type denotes date type information, and EMPTY denotes a field default value, which represents querying the whole hierarchy of the corresponding field. Here, it may be noted that, category='EMPTY' means querying all the hierarchies of category_l0 to category_l4; category_l0='EMPTY' means querying the hierarchies of category_l0 and hierarchies of category_l1; category_l1='EMPTY' means querying the hierarchies of category_l1 and hierarchies of category_l2; and the rest can be done in the same manner. Accordingly, a select field example of the candidate query request may be determined based on the hierarchical information and the field default value, i.e., "SELECT net_revenue, revenue_completion_rate, d_year, d_quarter, category, category_l0, category_l1, category_l2, category_l3, category_l4", where net_revenue denotes a revenue, revenue_completion_rate denotes a revenue completion rate, and the source of the query result is "FROM bap_acg_fin_complete_report". Thus, a SQL statement reference example of the target hierarchical level is generated based on the query condition example, the select field example, and the source of the query result as follows:

"SELECT net_revenue, revenue_completion_rate, d_year, d_month, category, category_l0, category_l1, category_l2, category_l3, category_l4

FROM bap_acg_fin_complete_report

WHERE d_year=2023 AND d_month IN (1,2,3) AND date_type='MONTH' AND page_type='ACG Core' AND category='sub-product' AND category_l0< >'EMPTY' AND category_l1='EMPTY' AND category_l2='EMPTY' AND category_l3='EMPTY' AND category_l4='EMPTY'".

For example, assuming the candidate query request is a query for a subordinate, a sub-team, various teams, various sub-teams, a sub-industry, various industries, and various sub-industries, for example, the preset candidate query request is "how was the revenue completion situation of a subordinate team from January to March of year 2023", then the query object of the candidate query request is determined to be "subordinate team", and the target hierarchical level of the query object is category_l1. Thus, a query condition example of the candidate query request may be determined based on the hierarchical information and the field default value, i.e., "WHERE d_year=2023 AND d_month IN (1,2,3) AND date_type='MONTH' AND page_type='ACG Core' AND category='sub-product' AND category_l0< >'EMPTY' AND category_l1='EMPTY' AND category_l2='EMPTY' AND category_l3='EMPTY' AND category_l4='EMPTY'". A select field example of the candidate query request may be determined based on the hierarchical information and the field default value, i.e., "SELECT net_revenue, revenue_completion_rate, d_year, d_month, category, category_l0, category_l1, category_l2, category_l3, category_l4", where d_month denotes month related information, and the source of the query result is "FROM bap_acg_fin_complete_report". Thus, a SQL statement reference example of the target hierarchical level is generated based on the query condition example, the select field example, and the source of the query result as follows:

> "SELECT net_revenue, revenue_completion_rate, d_year, d_month, category, category_l0, category_l1, category_l2, category_l3, category_l4
> FROM bap_acg_fin_complete_report
> WHERE d_year=2023 AND d_month IN (1,2,3) AND date_type='MONTH' AND page_type='ACG Core' AND category='sub-product' AND category_l0< >'EMPTY' AND category_l1='EMPTY' AND category_l2='EMPTY' AND category_l3='EMPTY' AND category_l4='EMPTY'".

For example, assuming the query is in the category_l3, the preset candidate query request is "which are L3 teams with a total team revenue of more than $1 million in Q1 of year 2023", and it is known that the hierarchical information corresponding to the query object is category_l3. Thus, the query condition example of the candidate query request may be determined based on the hierarchical information and the field default value, i.e., "WHERE d_year=2023 AND d_quarter=1 AND date_type='QUARTER' AND page_type='ACG Core' AND category='sub-product' AND category_l0< >'EMPTY' AND category_l1< >'EMPTY' AND category_l2< >'EMPTY' AND category_l3< >'EMPTY' AND category_l4='EMPTY' AND net_revenue>1000000". Accordingly, a select field example of the candidate query request is determined based on the hierarchical information and the field default value, i.e., "SELECT category_l3". The source of the query result is "FROM bap_acg_fin_complete_report". Thus, a SQL statement reference example of the target hierarchical level is generated based on the query condition example, the select field example, and the source of the query result, as follows:

> "SELECT category_l3
> FROM bap_acg_fin_complete_report
> WHERE d_year=2023 AND d_quarter=1 AND date_type='QUARTER' AND page_type='ACG Core' AND category='sub-product' AND category_l0< >'EMPTY' AND category_l1< >'EMPTY' AND category_l2< >'EMPTY' AND category_l3< >'EMPTY' AND category_l4='EMPTY' AND net_revenue>1000000".

At S306, fourth prompt information is generated based on the SQL statement reference example, the hierarchical information, the query request and the select field, and the SQL statement is obtained by inputting the fourth prompt information into the LLM.

Optionally, the hierarchical information and the SQL statement reference example may be taken as first information: second information is generated based on the query request and the select field: a current query time is obtained as third information: the hierarchical information of the query object for the query request is obtained as fourth information; a second target cue word is generated by writing the query request into a second preset cue word; and the fourth prompt information is obtained by splicing the first information, the second information, the third information, the fourth information, and the second target cue word.

Namely, the first information includes the complete hierarchical information and all the SQL statement reference examples, and the second information includes the information related to both the query request and the select field. Optionally, the information related to the query request may include, a revenue and a revenue completion rate that need to be returned for a query of the revenue: and a cost and a delivery cost that need to be returned for a query of the cost. The information related to the select field may include some requirements, for example, the select field needs to include hierarchical information of the service type information, time information (year, quarter, month), etc.

In some implementations, a current query time is obtained as third information, for example, in case that when the time of the current query is Jun. 28, 2023, the third information is Jun. 28, 2023.

In some implementations, the hierarchical information of the query object for the query request is obtained as fourth information. For example, the current hierarchical information is "page_type=ACG Core, category=EMPTY, category_l0=EMPTY, category_l1=EMPTY, category_l2=EMPTY, category_l3=EMPTY, category_l4=EMPTY", it may be understood that the corresponding next hierarchical information may be "page_type='ACG Core' AND category='sub-product' AND category_l0< >'EMPTY' AND category_l1='EMPTY' AND category_l2='EMPTY' AND category_l3='EMPTY' AND category_l4='EMPTY'.

In some implementations, in case that the team in the query request belongs to the "sub-product" type, category_l0< >'EMPTY' is used in the query condition statement: in case that the query request contains the expression "individual teams", it is processed as "sub-teams".

In some implementations, among the category*field in the 'where' condition of the SQL statement, the value of the category*field before the last category*field is not equal to 'EMPTY' cannot be equal to 'EMPTY', for example, in the following two cases.

> case 1: for the statement "category_l0< >'EMPTY' AND category_l1='EMPTY' AND category_l2< >'EMPTY' AND category_l3='EMPTY' AND category_l4='EMPTY'", there is an error in a result of this statement since the last category*field being not equal to 'EMPTY' is category_l2, but category_l1 is equal to 'EMPTY', which violates the requirement that the value of the category*field before the last category*field being not equal to 'EMPTY' cannot be equal to 'EMPTY', and the result is thus determined to be incorrect.
> case 2: for the statement "category_l0< >'EMPTY' AND category_l1< >'EMPTY' AND category_l2< >'EMPTY' AND category_l3='EMPTY' AND category_l4='EMPTY'", the result of this statement is correct, since the last category*field being not equal to 'EMPTY' is category_l2, and category_l0 and category_l1 before category_l2 are not equal to 'EMPTY', which is in line with the requirement that the value of the category*field before the last category*field being not equal to 'EMPTY' cannot be equal to 'EMPTY', and the result of the statement is thus determined to be correct.

In some implementations, the query request is written into a second preset cue word to generate a second target cue word, which is used to cue the LLM and improve the correctness of the output. Optionally, the second preset cue word needs to include a field related to the query request. Any field that does not exist in the data table cannot be forged and other content is not output.

Further, the fourth prompt information is obtained by splicing the first information, the second information, the third information, the fourth information, and the second target cue word, and the fourth prompt information is configured to prompt the LLM. The fourth prompt information includes information related to the query request and a SQL reference example, and the LLM outputs a more accurate SQL statement based on the fourth prompt information.

In some implementations, a syntax check on an initial SQL statement output may be performed by the LLM. For example, it is determined whether a syntax error exists in the SQL statement, by determining whether the SQL statement satisfies the above mentioned requirement that the value of the category*field before the last category*field being not equal to 'EMPTY' cannot be equal to 'EMPTY'. If a syntax error exists, an error log is input into the LLM and a syntax correction of the initial SQL statement is performed based on the error log until a final SQL statement is obtained and the accuracy of SQL statement is ensured.

Optionally, the error log may include, but is not limited to, information such as a query request corresponding to the current SQL statement with a syntax error, a current query time of the query request, an error reason or an error type of the syntax error, etc.

It may be understood that after inputting the error log into the LLM, the LLM may perform a syntax correction and adjustment of the initial SQL statement again based on the error log until a correct SQL statement is finally obtained.

In some implementations, in case that the correction on the initial SQL statement fails after the LLM corrects the initial SQL statement for several times, the generation of the current SQL statement may be stopped to avoid meaningless waste of computational resources. The fourth prompt information may be adjusted and the SQL statement may be generated again.

At S307, the query result corresponding to the query request is obtained by inputting the SQL statement into the LLM for execution.

In the embodiment of the present disclosure, the method for realizing the step S307 may be realized in any one of the respective embodiments of the present disclosure respectively, which is not limited herein and will not be repeated herein.

In the embodiment of the present disclosure, the SQL statement reference example adaptive to the different hierarchical level is generated based on the information such as the hierarchical information and the field default value of the field in the candidate service table, the fourth prompt information is generated by combining the SQL statement reference example and various information of the query request, and the fourth prompt information is input into the LLM, so that the LLM can better understand the SQL reference example, and output a more accurate and reasonable SQL statement for the query request based on the SQL reference example. The syntax check on the SQL statement is performed to avoid the syntax error of the SQL statement affecting the query result and to ensure the accuracy of the query result.

FIG. 4 is a flowchart illustrating a method for information processing based on a LLM according to an embodiment of the present disclosure. As shown in FIG. 4, the method includes, but is not limited to, the following the steps S401 to S406.

At S401, a query request is obtained.

In an embodiment of the present disclosure, the method for realizing the step S401 may be realized in any one of the respective embodiments of the present disclosure respectively, which is not limited herein and will not be repeated herein.

At S402, a query condition, a source of a query result, and a select field for generating a SQL statement is determined by interacting with the LLM based on the query request.

In the embodiment of the present disclosure, the method for realizing the step S402 may be realized in any one of the respective embodiments of the present disclosure respectively, which is not limited herein and will not be repeated herein.

At S403, the SQL statement is generated by combining the query condition, the source of the query result, and the select field based on the LLM.

In the embodiment of the present disclosure, the method for realizing the step S403 may be realized in any one of the respective embodiments of the present disclosure respectively, which is not limited herein and will not be repeated herein.

At S404, the query result corresponding to the query request is obtained by inputting the SQL statement into the LLM for execution.

In an embodiment of the present disclosure, the method for realizing step S404 may be realized in any one of the respective embodiments of the present disclosure respectively, which is not limited herein and will not be repeated herein.

At S405, a query result in a JSON format is obtained by performing a format conversion on the query result.

The JSON is a lightweight data exchange format that is easy to read and write, and easy for machine parsing and generation, so the format conversion of the query result can be performed and the query result is transformed into a more easily readable and understandable JSON format to facilitate subsequent processing of the query result.

At S406, a display cue word of the query result is obtained, and fifth prompt information is generated based on the display cue word and the query result in the JSON format, and a view display result of the query result is obtained by inputting the fifth prompt information into the LLM.

Optionally, the display cue word may be a cue word relevant to the display method, for example, the display cue word may be a line to cue the use of a line chart for display, and the display cue word may also be a bar, pie, and table, etc. to cue the use of a bar chart, a pie chart, or a table for display.

After the display cue word of the query result is obtained, the fifth prompt information is generated based on the display cue word and the query result in the JSON format, which is mainly used to prompt the model to display the query result in the JSON format in a manner corresponding to the display cue word.

Further, the fifth prompt information is input into the LLM, and the LLM processes the query result in the JSON format. The query result is displayed in the manner corresponding to the display cue word, to obtain a view display result of the query result. It may be understood that in case the display cue word is "bar", the query result in the JSON format processed by the LLM is displayed in the form of a bar chart, i.e., the view display result is a bar chart.

In the embodiment of the present disclosure, the query result is converted to a JSON format which is easy to understand and analyze after determining the query result, and the query result is displayed in an optimal form based on the display cue word of the query result, thus making the view display result of the query result more understandable and intuitive.

FIG. 5 is a flowchart illustrating a method for information processing based on a LLM according to an embodiment of the present disclosure. As shown in FIG. 5, the method includes, but is not limited to, the following steps S501 to S509.

At S501, a query request is obtained.

In the embodiment of the present disclosure, the method for realizing the step S501 may be realized in any one of the respective embodiments of the present disclosure respectively, which is not limited herein and will not be repeated herein.

At S502, first prompt information is generated based on the query request, and identification information of a query object is obtained as the query condition by inputting the first prompt information into the LLM.

In the embodiment of the present disclosure, the method for realizing the step S502 may be realized in any one of the respective embodiments of the present disclosure respectively, which is not limited herein and will not be repeated herein.

At S503, second prompt information is generated based on the query request and description information of a service table in a database, and a candidate service table is obtained as the source of the query result by inputting the second prompt information into the LLM.

In the embodiment of the present disclosure, the method for realizing the step S503 may be realized in any one of the respective embodiments of the present disclosure respectively, which is not limited herein and will not be repeated herein.

At S504, a create schema statement of the candidate service table is extracted and third prompt information is generated based on the create schema statement and the query request, and the select field is obtained by inputting the third prompt information into the LLM.

In the embodiment of the present disclosure, the method for realizing the step S504 may be realized in any one of the respective embodiments of the present disclosure respectively, which is not limited herein and will not be repeated herein.

At S505, hierarchical information and a field default value of a field in the candidate service table are obtained, and a SQL statement reference example of a different hierarchical level is generated based on the hierarchical information, the field default value, and the source of the query result.

In the embodiment of the present disclosure, the method for realizing the step S505 may be realized in any one of the respective embodiments of the present disclosure respectively, which is not limited herein and will not be repeated herein.

At S506, fourth prompt information is generated based on the SQL statement reference example, the hierarchical information, the query request and the select field, and the SQL statement is obtained by inputting the fourth prompt information into the LLM.

In an embodiment of the present disclosure, the method for realizing the step S506 may be realized in any one of the respective embodiments of the present disclosure respectively, which is not limited herein and will not be repeated herein.

At S507, the query result corresponding to the query request is obtained by inputting the SQL statement into the LLM for execution.

In the embodiment of the present disclosure, the method for realizing the step S507 may be realized in any one of the respective embodiments of the present disclosure respectively, which is not limited herein and will not be repeated herein.

At S508, a query result in a JSON format is obtained by performing a format conversion on the query result.

In the embodiment of the present disclosure, the method for realizing the step S508 may be realized in any one of the respective embodiments of the present disclosure respectively, which is not limited herein and will not be repeated herein.

At S509, a display cue word of the query result is obtained, and fifth prompt information is generated based on the display cue word and the query result in the JSON format, and a view display result of the query result is obtained by inputting the fifth prompt information into the LLM.

In the embodiment of the present disclosure, the method for realizing the step S509 may be realized in any one of the respective embodiments of the present disclosure respectively, which is not limited herein and will not be repeated herein.

In the embodiment of the present disclosure, the accuracy and integrity of the acquired various information of the query request are ensured by the more rich and complete prompt information, and information such as the description information of the service table in the database and the create schema statement of the candidate service table is used as a part of the prompt information, which ensures the integrity of the information contained in the prompt information. The SQL statement reference example adaptive to the different hierarchical level is generated based on information such as the hierarchical information and the field default value of the field in the candidate service table, the fourth prompt information is generated by combining the SQL statement reference example and the respective information of the query request, and the fourth prompt information is input into the LLM, so that the LLM can better understand the SQL reference example, and output a more accurate and reasonable SQL statement for the query request based on the SQL reference example. The query result is displayed in two ways: a data report and an optimal form, which is easy for users to understand and query, to solve the low flexibility problem when the SQL statement is obtained, and to improve the user experience.

Figures 6, 7:
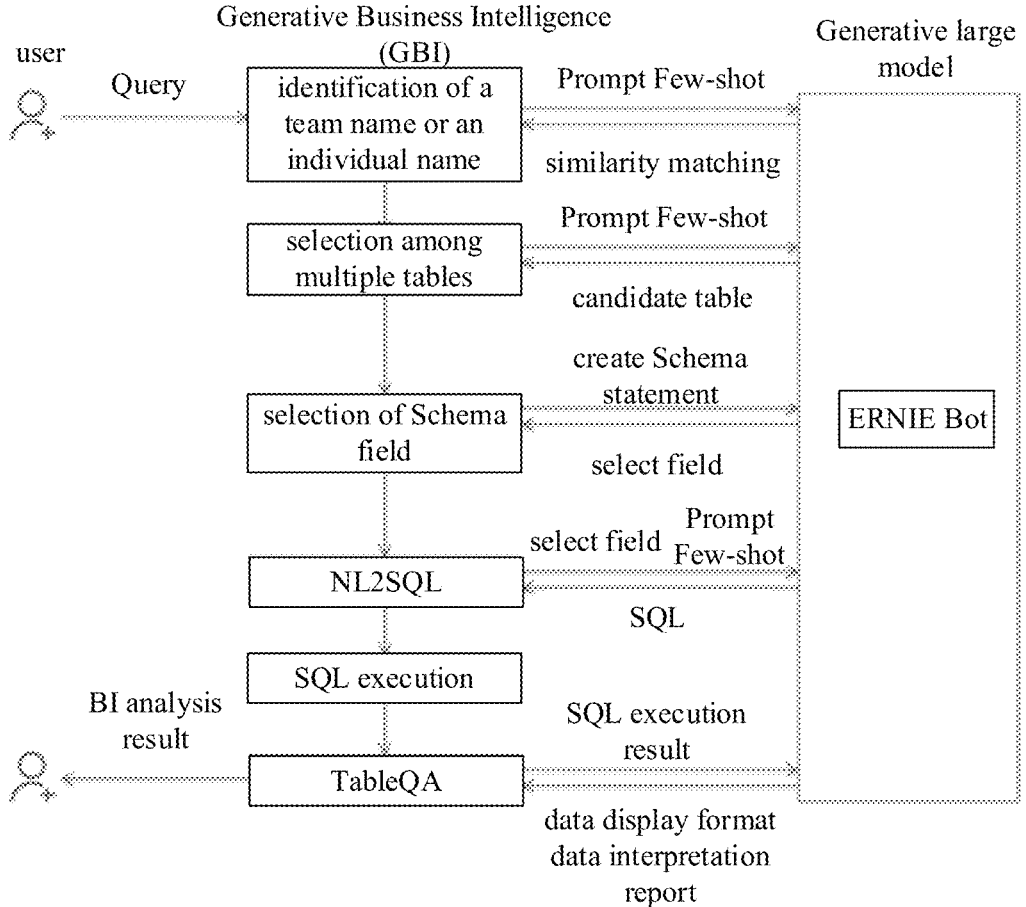
FIG. 6 is a logic diagram illustrating a method for information processing based on a LLM according to an embodiment of the present disclosure.
FIG. 7 is a logic diagram illustrating an extraction of a team name according to an embodiment of the present disclosure.

FIG. 6 is a schematic illustrating a method for information processing based on a LLM according to an embodiment of the present disclosure. As shown in FIG. 6, a user inputs a query request (Query), and first prompt information (Prompt) is generated based on the Query. The first prompt information is input into the LLM to output identification information (e.g., a team name or an individual name) of the query object, which is then used as a query condition to perform a subsequent query. A selection among multiple tables is further performed based on the Query, and a candidate service table (candidate table) is obtained based on the second prompt information (Prompt), which serves as the source of the query structure. Schema field selection is further performed, the third prompt information is determined based on the create schema statement and the query request, and is entered into the LLM to get the select field. The query condition, the source of the query result and the select field are combined and input into the LLM together with a SQL statement reference example (Few-shot), to get the generated SQL statement (NL2SQL). The SQL statement is executed, and the SQL statement (TableQA) is displayed. The query result is fed back to the user, that is, a BI analysis result.

Optionally, as shown in FIG. 7, which is a logic diagram illustrating an extraction of a team name. The prompt information (prompt) is generated based on the Query, and is input into the LLM, so that a team name and an individual name of the query object are parsed to determine whether a return result can be extracted. In case there is no result, "None" is returned, and in case there is a result, a similarity of a team list/individual list is calculated and the similarities are sorted, and a team or individual with the highest similarity is determined as a final result.

Figure 8:
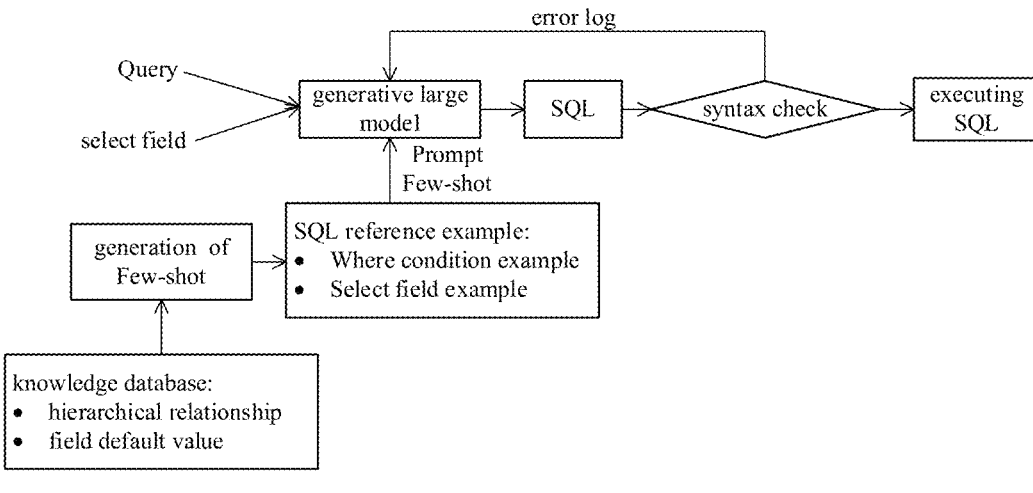
FIG. 8 is a logic flowchart illustrating a method for generating and executing a SQL statement according to an embodiment of the present disclosure.

Optionally, as shown in FIG. 8, which is a logical flowchart illustrating a method for generating and executing a SQL statemen. Firstly, a hierarchical relationship and a field default value are obtained from a knowledge database, and generation of a SQL reference example is performed, which is generation of a 'where' condition example and a select field example. The Query, the Select field, and the SQL reference example are combined as Prompt and the Prompt is input into the LLM to obtain a SQL statement. A syntax check is performed on the obtained SQL statement, and an error log is returned to the LLM in case that there is an error, so that the LLM corrects it to obtain a correct SQL statement for execution.

Figure 9:
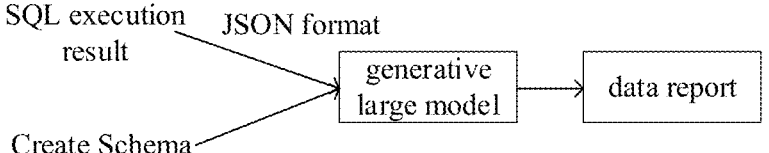
FIG. 9 is a logic diagram illustrating a display of a query result according to an embodiment of the present disclosure.

Optionally, as shown in FIG. 9, which is a logic display diagram illustrating a query result. The query result (i.e., the SQL execution result) is converted into one in the JSON format, the query result in the JSON format is input into the LLM to determine a best display form (a table, a bar chart, a pie chart, etc.), or the query result in the JSON format and the create schema statement are input into the LLM to generate a data report.

Figure 10:
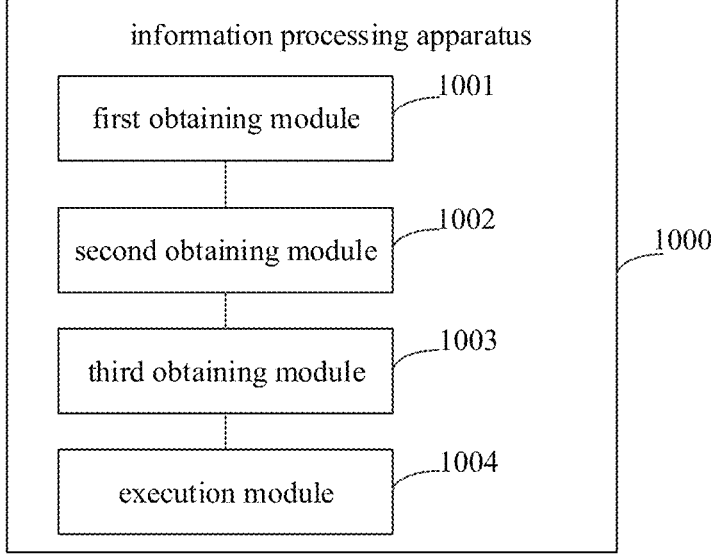
FIG. 10 is a structure diagram illustrating an apparatus for information processing based on a LLM according to an embodiments of the present disclosure.

FIG. 10) is a structure diagram illustrating an apparatus for information processing based on a LLM according to an embodiments of the present disclosure. As shown in FIG. 10, the apparatus 1000 for information processing based on a LLM includes a first obtaining module, a second obtaining module, a third obtaining module, and an execution module, The first obtaining module 1001 is configured to obtain a query request.

The second obtaining module 1002 is configured to determine a query condition, a source of a query result, and a select field for generating a SQL statement, by interacting with the LLM based on the query request.

The third obtaining module 1003 is configured to generate the SQL statement, by combining the query condition, the source of the query result, and the select field based on the LLM.

The execution module 1004 is configured to obtain the query result corresponding to the query request, by inputting the SQL statement into the LLM for execution.

In some implementations, the second obtaining module 1002 is configured to: generate first prompt information based on the query request, and obtain identification information of a query object as the query condition by inputting the first prompt information into the LLM: generate second prompt information based on the query request and description information of a service table in a database, and obtain a candidate service table as the source of the query result by inputting the second prompt information into the LLM: and extract a create schema statement of the candidate service table and generate third prompt information based on the create schema statement and the query request, and obtain the select field by inputting the third prompt information into the LLM.

In some implementations, the second obtaining module 1002 is further configured to: obtain configuration information of the database and determine the description information of the service table based on the configuration information.

In some implementations, the second obtaining module 1002 is configured to: generate table reference information based on the description information of the service table, and generate a first target cue word by writing the query request into a first preset cue word: and generate the second prompt information by splicing the table reference information and the first target cue word.

In some implementations, the third obtaining module 1003 is configured to: obtain hierarchical information of a field in the candidate service table and a field default value of the field, and generate a SQL statement reference example of a different hierarchical level based on the hierarchical information, the field default value, and the source of the query result: and generate fourth prompt information based on the SQL statement reference example, the hierarchical information, the query request and the select field, and obtain the SQL statement by inputting the fourth prompt information into the LLM.

In some implementations, the third obtaining module 1003 is configured to: obtain a preset candidate query request and determine a target hierarchical level of a query object for the candidate query request: and determine a query condition example and a select field example for the candidate query request based on the hierarchical information and the field default value: and generate a SQL statement reference example for the target hierarchical level based on the query condition example, the select field example, and the source of the query result.

In some implementations, the third obtaining module 1003 is configured to: take the hierarchical information and the SQL statement reference example as first information: and generate second information based on the query request and the select field: and obtain a current query time as third information: and obtain the hierarchical information of the query object for the query request as fourth information: and generate a second target cue word by writing the query request into a second preset cue word: and obtain the fourth prompt information by splicing the first information, the second information, the third information, the fourth information, and the second target cue word.

In some implementations, the third obtaining module 1003 is configured to: perform a syntax check on an initial SQL statement output by the LLM; and in response to determining a syntax error exists, input an error log into the LLM and perform a syntax correction of the initial SQL statement based on the error log until a final SQL statement is obtained.

In some implementations, the execution module 1004 is configured to: obtain a query result in a JSON format by performing a format conversion on the query result: and obtain a display cue word of the query result, and generate fifth prompt information based on the display cue word and the query result in the JSON format, and obtain a view display result of the query result by inputting the fifth prompt information into the LLM.

In some implementations, the execution module 1004 is configured to: obtain a query result in a JSON format by performing a format conversion on the query result: and generate sixth prompt information based on the create schema statement and the query result in the JSON format, and obtain a data report of the query result by inputting the sixth prompt information into the LLM.

In the embodiment of the present disclosure, the SQL statement is generated based on information such as the query condition related to the query request, the source of the query result, and the select field, which improves the flexibility of generating the SQL statement. The different query request corresponds to the different SQL statement, which may ensure the query result obtained based on the SQL statement and the LLM to be more accurate, solve the low flexibility problem when the SQL statement is obtained, and improve the user experience.

In the technical solution of the present disclosure, the acquisition, storage and application of the personal information of the users are in compliance with relevant laws and regulations, and do not violate public order and morals.

According to embodiments of the present disclosure, it also provides an electronic device, a readable storage medium, and a computer program product.

Figure 11:
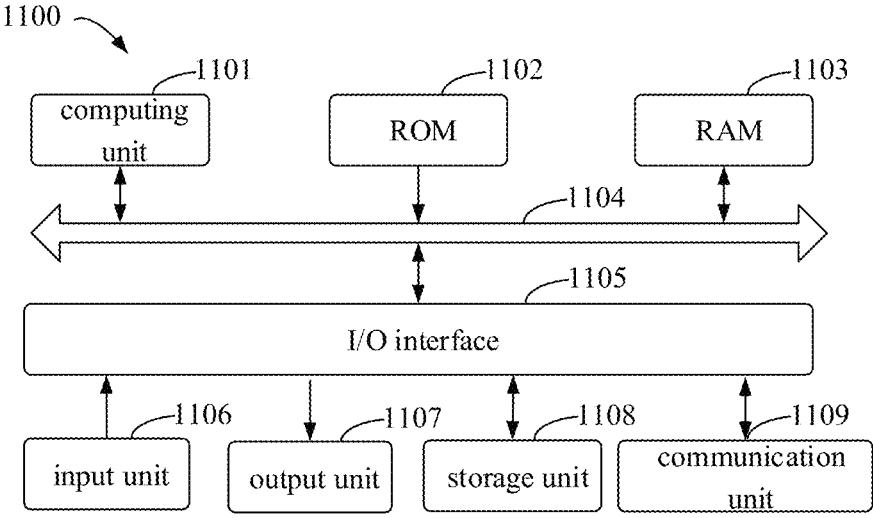
FIG. 11 is a block diagram illustrating an electronic device for information processing based on a LLM according to an embodiment of the present disclosure.

Referring to FIG. 11, it is a block diagram illustrating an electronic device according to an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile devices, such as personal digital assistants, cellular phones, smart phones, wearable devices, and other similar computing devices. The components shown herein, their connections and relations, and their functions are merely examples, which are not intended to limit the implementations of the disclosure described and/or required herein.

As shown in FIG. 11, the device 1100 includes a computing unit 1101, configured to execute various appropriate actions and processes according to a computer program stored in a read-only memory (ROM) 1102 or a computer program loaded from a storage unit 1108 to a random access memory (RAM) 1103. In the RAM 1103, various programs and data required for the device 1100 may be stored. The computing unit 1101, the ROM 1102 and the RAM 1103 may be connected with each other by a bus 1104. An input/output (I/O) interface 1105 is also connected to the bus 1104.

The plurality of components in the device 1100 are connected to the I/O interface 1105, which include: an input unit 1106, for example, a keyboard, a mouse: an output unit 1107, for example, various types of displays, speakers: a storage unit 1108, for example, a magnetic disk, an optical disk: and a communication unit 1109, for example, a network card, a modem, a wireless transceiver. The communication unit 1109 allows the device 1100 to exchange information/data through a computer network such as Internet and/or various types of telecommunication networks with other devices.

The computing unit 1101 may be various types of general and/or dedicated processing components with processing and computing abilities. Some examples of a computing unit 1101 include but not limited to a central processing unit (CPU), a graphics processing unit (GPU), various dedicated artificial intelligence (AI) computing chips, various computing units on which a machine learning model algorithm is running, a digital signal processor (DSP), and any appropriate processor, controller, microcontroller, etc. The computing unit 1101 executes various methods and processes as described above, for example, a method for information processing based on a LLM. For example, in some embodiments, the method for information processing may be further implemented as a computer software program, which is tangibly contained in a machine readable medium, such as the storage unit 1108. In some embodiments, a part or all of the computer program may be loaded and/or installed on the device 1100 via the ROM 1102 and/or the communication unit 1109. When the computer program is loaded on the RAM 1103 and executed by the computing unit 1101, one or more steps in the method for information processing based on a LLM may be performed as described above. Optionally, in other embodiments, the computing unit 1101 may be configured to the method for information processing based on a LLM in other appropriate ways (for example, by virtue of a firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, RAMs, ROMs, Electrically Programmable Read-Only-Memory (EPROM), fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user): and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: a Local Area Network (LAN), a Wide Area Network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the principle of the disclosure shall be included in the protection scope of the disclosure.

What is claimed is:

1. A computer-implemented method for information processing based on a large language model (LLM), the method comprising:

obtaining a query request from a user;

generating first prompt information based on the query request, and obtaining identification information of a query object as a query condition by inputting the first prompt information into the LLM;

generating second prompt information based on the query request and description information of a service table in a database, and obtaining a candidate service table as a source of a query result by inputting the second prompt information into the LLM;

extracting a create schema statement of the candidate service table and generating third prompt information based on the create schema statement and the query request, and obtaining a select field by inputting the third prompt information into the LLM, wherein the create schema statement is a statement for creating a new table;

generating, by the LLM, a structured query language (SQL) statement by combining the query condition, the source of the query result, and the select field; and obtaining the query result corresponding to the query request, by inputting the SQL statement into the LLM for execution;

wherein generating second prompt information based on the query request and the description information of the service table in the database comprises:

generating table reference information based on the description information of the service table, and generating a first target cue word by writing the query request into a first preset cue word; and generating the second prompt information by splicing the table reference information and the first target cue word.

2. The method according to claim 1, wherein before generating second prompt information based on the query request and the description information of the service table in the database, the method further comprises:

obtaining configuration information of the database and determining the description information of the service table based on the configuration information.

3. The method according to claim 1, wherein generating the SQL statement, by combining the query condition, the source of the query result, and the select field based on the LLM comprises:

obtaining hierarchical information of a field in the candidate service table and a field default value of the field, and generating a SQL statement reference example of a different hierarchical level based on the hierarchical information, the field default value, and the source of the query result; and generating fourth prompt information based on the SQL statement reference example, the hierarchical information, the query request and the select field, and obtaining the SQL statement by inputting the fourth prompt information into the LLM.

4. The method according to claim 3, wherein generating the SQL statement reference example for the different hierarchical level based on the hierarchical information, the field default value, and the source of the query result comprises:

obtaining a preset candidate query request and determining a target hierarchical level of a query object for the candidate query request; and determining a query condition example and a select field example for the candidate query request based on the hierarchical information and the field default value; and generating a SQL statement reference example for the target hierarchical level based on the query condition example, the select field example, and the source of the query result.

5. The method according to claim 4, wherein generating the fourth prompt information based on the SQL statement reference example, the hierarchical information, the query request and the select field comprises:

taking the hierarchical information and the SQL statement reference example as first information; and generating second information based on the query request and the select field; and obtaining a current query time as third information; and obtaining hierarchical information of the query object for the query request as fourth information; and generating a second target cue word by writing the query request into a second preset cue word; and obtaining the fourth prompt information by splicing the first information, the second information, the third information, the fourth information, and the second target cue word.

6. The method according to claim 3, wherein obtaining the SQL statement by inputting the fourth prompt information into the LLM comprises:

performing a syntax check on an initial SQL statement output by the LLM; and in response to determining a syntax error exists, inputting an error log into the LLM and performing a syntax correction of the initial SQL statement based on the error log until a final SQL statement is obtained.

7. The method according to claim 1, wherein obtaining the query result corresponding to the query request, by inputting the SQL statement into the LLM for execution comprises:

obtaining a query result in a java script object notation (JSON) format by performing a format conversion on the query result; and obtaining a display cue word of the query result, and generating fifth prompt information based on the display cue word and the query result in the JSON format, and obtaining a view display result of the query result by inputting the fifth prompt information into the LLM.

8. The method according to claim 1, wherein obtaining the query result corresponding to the query request, by inputting the SQL statement into the LLM for execution comprises:

obtaining a query result in a java script object notation (JSON) format by performing a format conversion on the query result; and generating sixth prompt information based on the create schema statement and the query result in the JSON format, and obtaining a data report of the query result by inputting the sixth prompt information into the LLM.

9. An electronic device, comprising:

at least one processor; and a memory communicatively coupled to the at least one processor and storing instructions executable by the at least one processor;

wherein the at least one processor is configured to:

obtain a query request from a user; and generate first prompt information based on the query request, and obtain identification information of a query object as a query condition by inputting the first prompt information into a large language model (LLM);

generate second prompt information based on the query request and description information of a service table in a database, and obtain a candidate service table as a source of a query result by inputting the second prompt information into the LLM;

extract a create schema statement of the candidate service table and generating third prompt information based on the create schema statement and the query request, and obtain a select field by inputting the third prompt information into the LLM, wherein the create schema statement is a statement for creating a new table;

generate, by the LLM, a structured query language (SQL) statement by combining the query condition, the source of the query result, and the select field; and obtain the query result corresponding to the query request, by inputting the SQL statement into the LLM for execution;

wherein the at least one processor is further configured to:

generate table reference information based on the description information of the service table, and generate a first target cue word by writing the query request into a first preset cue word; and generate the second prompt information by splicing the table reference information and the first target cue word.

10. The electronic device according to claim 9, wherein before generating second prompt information based on the query request and the description information of the service table in the database, the at least one processor is further configured to:

obtain configuration information of the database and determine the description information of the service table based on the configuration information.

11. The electronic device according to claim 9, wherein the at least one processor is further configured to:

obtain hierarchical information of a field in the candidate service table and a field default value of the field, and generate a SQL statement reference example of a different hierarchical level based on the hierarchical information, the field default value, and the source of the query result; and generate fourth prompt information based on the SQL statement reference example, the hierarchical information, the query request and the select field, and obtain the SQL statement by inputting the fourth prompt information into the LLM.

12. The electronic device according to claim 11, wherein the at least one processor is further configured to:

obtain a preset candidate query request and determine a target hierarchical level of a query object for the candidate query request; and determine a query condition example and a select field example for the candidate query request based on the hierarchical information and the field default value; and generate a SQL statement reference example for the target hierarchical level based on the query condition example, the select field example, and the source of the query result.

13. The electronic device according to claim 12, wherein the at least one processor is further configured to:

take the hierarchical information and the SQL statement reference example as first information; and generate second information based on the query request and the select field; and obtain a current query time as third information; and obtain hierarchical information of the query object for the query request as fourth information; and generate a second target cue word by writing the query request into a second preset cue word; and obtain the fourth prompt information by splicing the first information, the second information, the third information, the fourth information, and the second target cue word.

14. The electronic device according to claim 11, wherein the at least one processor is further configured to:

perform a syntax check on an initial SQL statement output by the LLM; and in response to determining a syntax error exists, input an error log into the LLM and perform a syntax correction of the initial SQL statement based on the error log until a final SQL statement is obtained.

15. The electronic device according to claim 9, wherein the at least one processor is further configured to:

obtaining a query result in a java script object notation (JSON) format by performing a format conversion on the query result; and obtain a display cue word of the query result, and generate fifth prompt information based on the display cue word and the query result in the JSON format, and obtain a view display result of the query result by inputting the fifth prompt information into the LLM.

16. A non-transitory computer readable storage medium, storing computer instructions, wherein the computer instructions are caused to enable a computer to perform a method for information processing based on a large language model (LLM), the method comprising obtaining a query request from a user;

generating first prompt information based on the query request, and obtaining identification information of a query object as a query condition by inputting the first prompt information into the LLM;

generating second prompt information based on the query request and description information of a service table in a database, and obtaining a candidate service table as a source of a query result by inputting the second prompt information into the LLM;

extracting a create schema statement of the candidate service table and generating third prompt information based on the create schema statement and the query request, and obtaining a select field by inputting the third prompt information into the LLM, wherein the create schema statement is a statement for creating a new table;

generating, by the LLM, a structured query language (SQL) statement by combining the query condition, the source of the query result, and the select field; and obtaining the query result corresponding to the query request, by inputting the SQL statement into the LLM for execution;

wherein generating second prompt information based on the query request and the description information of the service table in the database comprises:

generating table reference information based on the description information of the service table, and generating a first target cue word by writing the query request into a first preset cue word; and generating the second prompt information by splicing the table reference information and the first target cue word.

* * * * *